United States Patent
Strickler et al.

(10) Patent No.: US 12,285,989 B1
(45) Date of Patent: *Apr. 29, 2025

(54) SPLINED TORSION BAR FOR VEHICLE STEERING SYSTEM

(71) Applicant: Steering Solutions IP Holding Corporation, Saginaw, MI (US)

(72) Inventors: Allyn J. Strickler, Saginaw, MI (US); Christopher L. Walsh, Saginaw, MI (US); Eric D. Pattok, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,881

(22) Filed: Mar. 30, 2024

(51) Int. Cl.
*B60G 21/055* (2006.01)

(52) U.S. Cl.
CPC ...... *B60G 21/055* (2013.01); *B60G 2202/132* (2013.01)

(58) Field of Classification Search
CPC .................................................. B60G 21/055
See application file for complete search history.

(56) References Cited

U.S. PATENT DOCUMENTS

| 11,020,827 B2 | 6/2021 | Pattok et al. |
| 11,965,572 B2 | 4/2024 | Pattok et al. |
| 2019/0277330 A1* | 9/2019 | Pattok .................. B21J 5/12 |

FOREIGN PATENT DOCUMENTS

| CN | 210830320 U | * | 6/2020 |
| CN | 218806066 U | * | 4/2023 |

* cited by examiner

*Primary Examiner* — Faye M Fleming
(74) *Attorney, Agent, or Firm* — Dickinson Wright PLLC

(57) ABSTRACT

A torsion bar for a vehicle steering system includes a first end region. The torsion bar also includes a second end region. The torsion bar further includes a main body extending about a longitudinal axis of the torsion bar from the first end region to the second end region, wherein the main body defines a plurality of splines circumferentially spaced from each other to form a splined outer surface extending along the entire length of the main body.

10 Claims, 3 Drawing Sheets

SPLINED TORSION BAR FOR VEHICLE STEERING SYSTEM

FIELD OF THE INVENTION

The subject invention relates to torsion bars and, more particularly, to a splined torsion bar for a steering assembly.

BACKGROUND OF THE INVENTION

A power steering assembly of a vehicle may include a power assisted device that facilitates the turning of a steering wheel by a vehicle operator. In order to achieve the function of the power steering, it may be necessary to provide a torsion bar which has a primary function of being a torsion spring providing a specified torsional stiffness in order to facilitate the measuring of the vehicle operator input torque. Typically, the geometry of a torsion bar is a circular cross-section in a mid-portion and serrated (i.e., splined) on end portions thereof. The splines are pressed with interference into two separate mating components, with the ends of the torsion bar drilled and pinned to the shafts to which it is mated. Therefore, the assembly process is complex and would benefit from simplification. Additionally, as with all metal bars experiencing twisting, a reduction in hysteresis is a goal for torsion bar designers.

SUMMARY OF THE DISCLOSURE

According to one aspect of the disclosure, a torsion bar for a vehicle steering system includes a first end region. The torsion bar also includes a second end region. The torsion bar further includes a main body extending about a longitudinal axis of the torsion bar from the first end region to the second end region, wherein the main body defines a plurality of splines circumferentially spaced from each other to form a splined outer surface extending along the entire length of the main body.

According to another aspect of the disclosure, a torsion bar for a vehicle steering system includes a first end region. The torsion bar also includes a second end region. The torsion bar further includes a main body extending about a longitudinal axis of the torsion bar from the first end region to the second end region, wherein the main body defines a constant cross-section along an entire length thereof, wherein the main body includes a plurality of splines circumferentially spaced from each other on an outer surface of the main body.

According to another aspect of the disclosure, a vehicle steering system includes a first steering shaft component. The vehicle steering system also includes a second steering shaft component. The vehicle steering system further includes a torsion bar coupling the first steering shaft component and the second steering shaft component to each other. The torsion bar includes a first end region. The torsion bar also includes a second end region. The torsion bar further includes a main body positioned between, and integrally formed with, the first end region and the second end region, extending about a longitudinal axis of the torsion bar from the first end region to the second end region, wherein the main body defines a constant cross-section along an entire length thereof, wherein the main body includes a plurality of splines circumferentially spaced from each other on an outer surface of the main body.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated is a torsion bar for use in a steering system. Power steering systems may incorporate a torsion bar in hydraulic and electric assist steering systems. The torsion bar typically facilitates measurement of driver torque by sensing the deflection of the torsion bar and movement of the input shaft relative to the output shaft. In addition, the torsion bar also provides the necessary torque coupling between the driver and the rest of the steering system, thus providing a desired tactile "feel" to the user. As will be appreciated from the description herein, the disclosed torsion bar includes features that reduce hysteresis associated with the torsion bar. Additionally, the manufacturing process and assembly process employed to form and install the torsion bar is significantly simplified and less costly when compared to prior designs.

Figure 1:
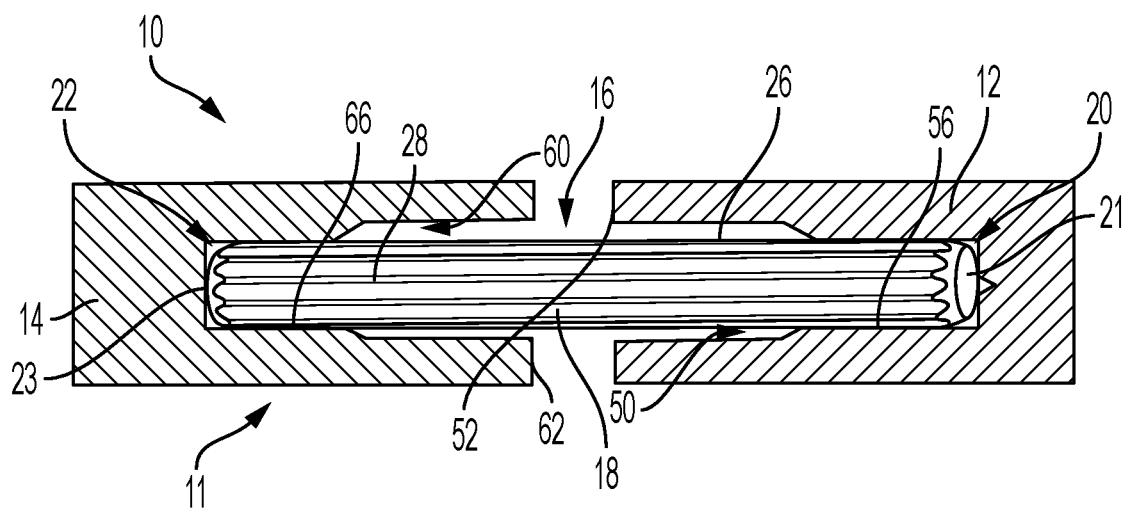
FIG. 1 is a sectional view of a portion of a steering shaft assembly of a steering system.

Referring now to FIG. 1 a portion of a steering system 10 having a steering shaft assembly is illustrated. In particular, a portion of the steering shaft assembly is shown and referenced generally with numeral 11. The steering shaft assembly 11 includes an input shaft 12, also referred to herein as a first shaft. The input shaft 12 is operatively coupled to a steering input device, such as a steering wheel (not shown), and rotates in response to rotation of the steering wheel by a user. The input shaft 12 is operatively coupled to an output shaft 14, also referred to herein as a second shaft, with a torsion bar 16, as will be further described below. Upon final assembly, the torsion bar 16 imparts a torque on the steering input device that provides a tactile response to the driver and assists in measurement of torque and position of steering system components.

The torsion bar 16 is a single, integrally formed component which interfaces with the input shaft 12 and the output shaft 14 without any intervening components and without the need for drilling and securing the torsion bar 16 to the shafts 12, 14 with any mechanical fasteners. For example, the torsion bar 16 does not include separate end members to be mechanically fastened to the torsion bar 16.

Figure 2:
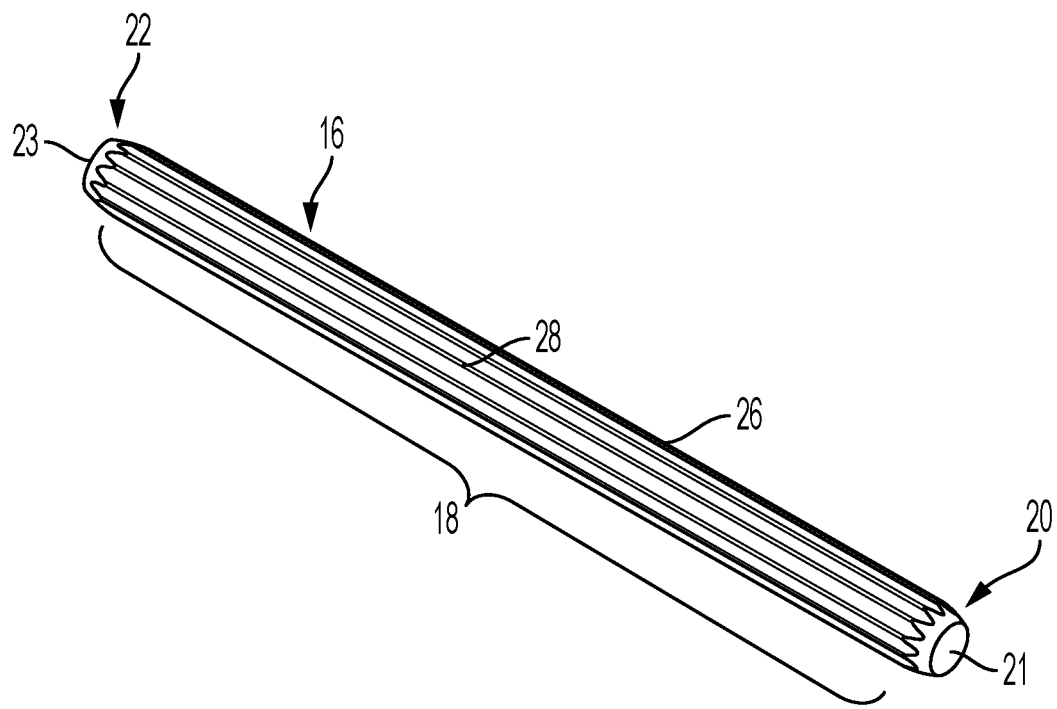
FIG. 2 is a perspective view of a torsion bar.

Referring now to FIGS. 1 and 2, the torsion bar 16 includes a main body 18 extending about an axial direction along a longitudinal axis A of the torsion bar 16. The torsion bar 16 also includes a first end region 20 and a second end region 22. The first end region 20 and the second end region 22 include chamfers in some embodiments. In particular, the chamfers are formed by the outer surface of the first and second end regions 20, 22 angling radially inwardly as the torsion bar 16 extends axially toward a first terminal end 21 and a second terminal end 23, respectively. The chamfers located at the first end region 20 and the second end region 22 of the torsion bar 16 assist with insertion of the torsion bar 16 into bores defined by the input shaft 12 and the output shaft 14.

The main body 18 of the torsion bar 16 has a substantially constant cross-section along its entire axial length. In particular, the main body 18 has a splined outer surface 26 which is defined by a plurality of serrations formed in the outer surface of the torsion bar 16 to define a plurality of splines 28 circumferentially spaced from each other and extending longitudinally in a direction parallel to the longitudinal axis A of the torsion bar 16. In some embodiments, the splined outer surface 26 extends completely to the first end 21 and/or the second end 23 of the torsion bar 16. However, the splined outer surface 26 may be limited to the main body 18 of the torsion bar 16, as shown in the illustrated embodiment. In some embodiments, the splined outer surface extends only partially along the length of the main body 18 of the torsion bar, where other embodiments include the entirety of the main body 18 having a splined outer surface.

Referring again to FIG. 1, the first end region 20 is inserted into a bore 50 of the input shaft 12. The bore 50 extends from an end 52 of the input shaft 12, such that the end 52 defines an opening to receive the torsion bar 16. The torsion bar 16 is coupled to the input shaft 12 by press fitting the torsion bar 16 into the bore 50, specifically by press fitting the splined outer surface 26 with a wall 56 defining the bore 50, the press fitting placing the torsion bar 16 into an interference condition with the input shaft 12. The torsion bar 16 extends out of the bore 50 in a protruding manner. The torsion bar 16 is also inserted into a bore 60 of the output shaft 14. The bore 60 extends from an end 62 of the output shaft 14, such that the end 62 defines an opening to receive the torsion bar 16. The torsion bar 16 is coupled to the output shaft 14 by press fitting the torsion bar 16 into the bore 60, specifically by press fitting the splined outer surface 26 with a wall 66 defining the bore 60, the press fitting placing the torsion bar 16 into an interference condition with the output shaft 14. The torsion bar 16 extends out of the bore 60 in a protruding manner. It is to be appreciated that the torsion bar 16 may be press fit to the input shaft 12 and the output shaft 14 in any particular order.

The torsion bar 16 may be characterized as non-circular due to the serrations and splines forming the splined outer surface 26. The torsion bar 16 is also distinct from prior torsion bars which have lobes or other polygonal cross-sections along part or all of the length thereof.

The torsion bar 16 described herein advantageously press fits to the mating components without the need for separate components or mechanical fasteners. The uniform, integral structure of the torsion bar 16, combined with the fully splined length of the main body 18 of the torsion bar 16, provides a low hysteresis connection with the mating components, thereby improving overall operation of the power steering system which the torsion bar 16 is utilized within.

Figure 3:
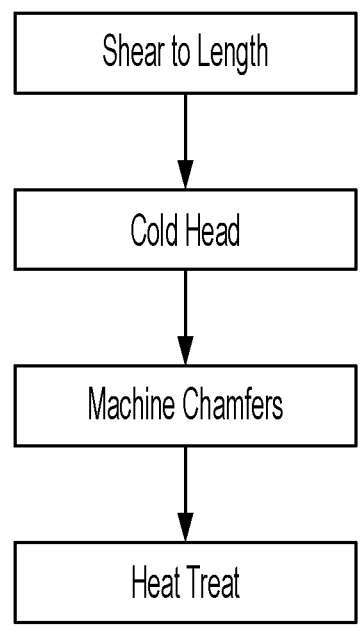
FIG. 3 is a flow chart illustrating a method of making the torsion bar.

As represented in FIG. 3, the embodiments described herein facilitate a simplified and less costly manufacturing process and assembly process for the torsion bar 16. In particular, the torsion bar 16 is provided as a blank length of material and sheared to a desired length. The appropriate length of the blank is then subjected to a cold heading process to form the plurality of splines. The chamfers are machined at the end regions. A heat treatment is utilized to increase the hardness of the material for reduced hysteresis. Therefore, process steps and costly machinery associated with torsion bar manufacturing are avoided, when compared to previously known torsion bars.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A torsion bar for a vehicle steering system comprising:
   a first end region;
   a second end region;
   a main body extending about a longitudinal axis of the torsion bar from the first end region to the second end region, wherein the main body defines a plurality of splines circumferentially spaced from each other to form a splined outer surface extending along the entire length of the main body, wherein the first end region defines a first chamfer from the main body to a first terminal end of the torsion bar, wherein the first chamfer is defined by the first end region angling radially inwardly from the main body to the first terminal end.

2. The torsion bar of claim 1, wherein the torsion bar is a single, integrally formed component.

3. The torsion bar of claim 1, wherein the main body defines a constant cross-section along the entire length thereof.

4. The torsion bar of claim 1, wherein the second end region defines a second chamfer from the main body to a second terminal end of the torsion bar, wherein the second chamfer is defined by the second end region angling radially inwardly from the main body to the second terminal end.

5. A torsion bar for a vehicle steering system comprising:
   a first end region;
   a second end region;
   a main body extending about a longitudinal axis of the torsion bar from the first end region to the second end region, wherein the main body defines a constant cross-section along an entire length thereof, wherein the main body includes a plurality of splines circumferentially spaced from each other on an outer surface of the main body, wherein the first end region defines a first chamfer from the main body to a first terminal end of the torsion bar, wherein the first chamfer is defined by the first end region angling radially inwardly from the main body to the first terminal end.

6. The torsion bar of claim 5, wherein the torsion bar is a single, integrally formed component.

7. The torsion bar of claim 5, wherein the second end region defines a second chamfer from the main body to a second terminal end of the torsion bar, wherein the second chamfer is defined by the second end region angling radially inwardly from the main body to the second terminal end.

8. A vehicle steering system comprising:
   a first steering shaft component;
   a second steering shaft component; and
   a torsion bar coupling the first steering shaft component and the second steering shaft component to each other, the torsion bar comprising:
   a first end region;
   a second end region; and
   a main body positioned between, and integrally formed with, the first end region and the second end region, extending about a longitudinal axis of the torsion bar from the first end region to the second end region, wherein the main body defines a constant cross-section along an entire length thereof, wherein the main body includes a plurality of splines circumferentially spaced from each other on an outer surface of the main body, wherein the first end region defines a first chamfer from the main body to a first terminal end of the torsion bar, wherein the first chamfer is defined by the first end region angling radially inwardly from the main body to the first terminal end.

9. The vehicle steering system of claim 8, wherein the second end region defines a second chamfer from the main body to a second terminal end of the torsion bar, wherein the second chamfer is defined by the second end region angling radially inwardly from the main body to the second terminal end.

10. The vehicle steering system of claim 8, wherein the first steering shaft component is an input shaft and the second steering shaft component is an output shaft.

\* \* \* \* \*